No. 753,385.

Patented March 1, 1904.

UNITED STATES PATENT OFFICE.

HENRY A. GERDES, OF MINNEAPOLIS, MINNESOTA, ASSIGNOR OF FIFTY-FIVE ONE-HUNDREDTHS TO F. W. CAPPELEN, ARTHUR H. ELFTMAN, AND JAMES B. CULL, OF MINNEAPOLIS, MINNESOTA.

PROCESS OF MATURING PORTLAND OR OTHER HYDRAULIC CEMENTS.

SPECIFICATION forming part of Letters Patent No. 753,385, dated March 1, 1904.

Application filed April 7, 1903. Serial No. 151,518. (No specimens.)

*To all whom it may concern:*

Be it known that I, HENRY A. GERDES, a citizen of the United Sates, residing at Minneapolis, in the county of Hennepin and State of Minnesota, have invented new and useful Improvements in Processes of Maturing Portland or other Hydraulic Cements, of which the following is a specification.

This invention relates to the process of maturing cement by means of heating and the application of a current of air charged with moisture and carbonic acid, and has for its object to render the process more expeditious and considerably cheaper.

Hitherto the maturing of cement has been achieved by hydration or aeration consequent upon its exposure to the action of the atmosphere for a long time. The absorption of moisture and carbonic acid from the atmosphere increases its bulk, modifies its setting qualities, and destroys the obnoxious properties of the free lime. Instead of depending upon the action of the atmosphere for the hydration or aeration necessary to mature it I attain the same results by passing the cement through a heat of 360° Fahrenheit and through a current of air charged with moisture and carbonic acid. The action of the heat expands the cement and produces a more finely divided condition. In this condition the cement is more easily attacked by the moisture and carbonic acid and their action rendered very much more energetic. Hydration is immediately effected, and cement treated in this manner directly after the completion of the grinding is ready for immediate use. A cement partly matured may be subjected to this treatment and the process of maturing thereby completed. I do not confine myself to a temperature of 360° Fahrenheit, for I have attained the same results of maturing with a higher heat, in which case the cement so treated possesses a much greater activity in setting.

To carry out this operation, I may use any suitable style of the horizontal revolving furnace fitted with suitable devices; but in this specification I do not claim to confine myself to the use of any one particular kind of appliance for the purposes specified.

What I claim as my invention, and desire to secure by Letters Patent, is—

In the process of maturing Portland and other hydraulic cements, the subjecting them to a heat of 360° Fahrenheit and to a current of air charged with moisture and carbonic acid, for the purpose substantially as set forth.

In testimony whereof I have signed my name to this specification in the presence of two subscribing witnesses.

HENRY A. GERDES.

Witnesses:
M. G. RODSANNEL,
T. R. DANIEL.